Patented May 12, 1936

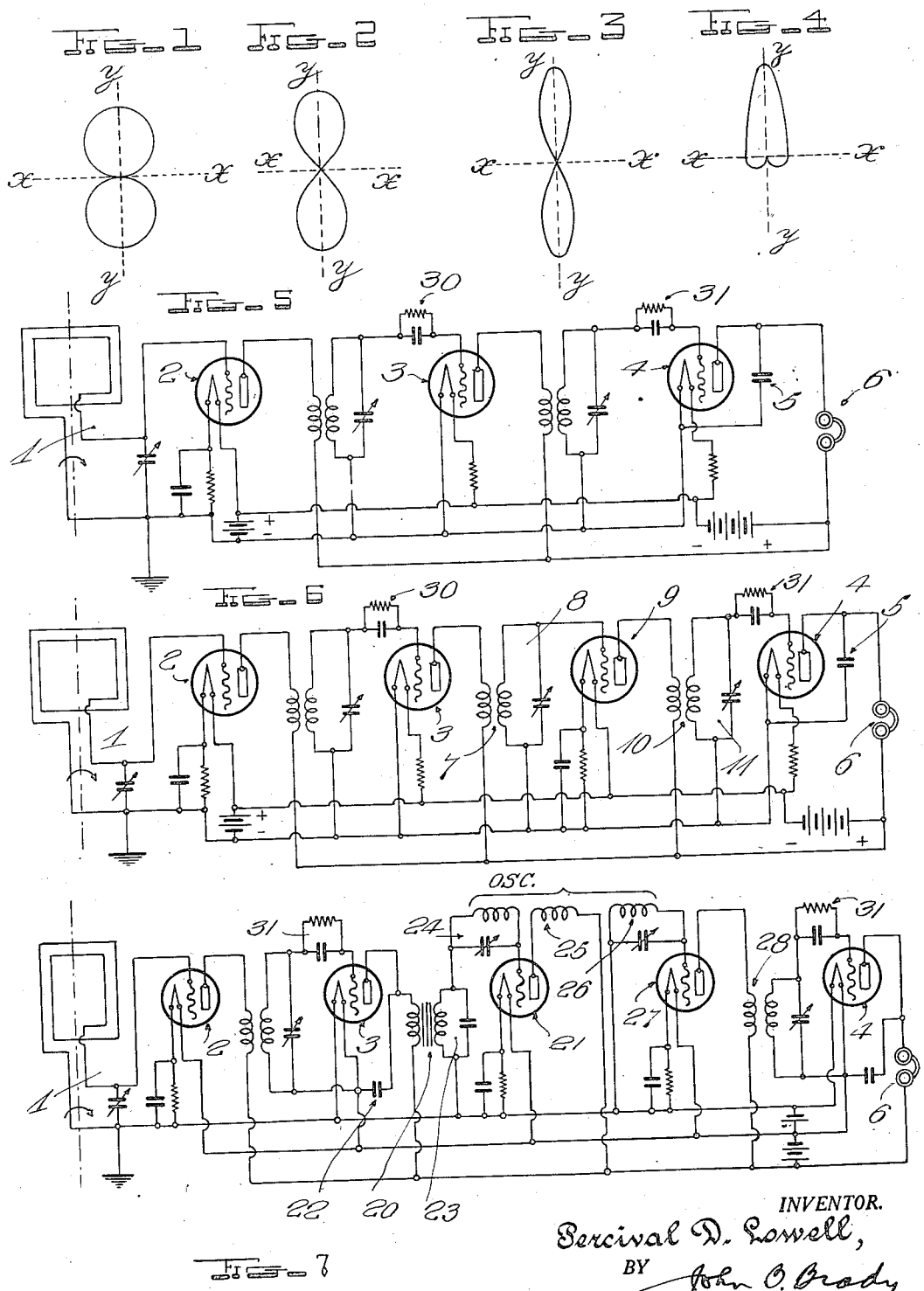

2,040,520

UNITED STATES PATENT OFFICE 2,040,520

RADIO DIRECTION FINDER

Percival D. Lowell, Chevy Chase, Md., assignor to Radio Corporation of America, New York, N. Y., a corporation of Delaware Application June 10, 1933, Serial No. 675,320

7 Claims. (Cl. 250—11)

My invention relates broadly to radio receiving apparatus, and more particularly to radio receiving apparatus to be used in conjunction with closed loop antenna for the purpose of direction finding.

One of the objects of my invention is to provide a circuit arrangement for a direction finder system by which the maximum signal may be employed for precise and accurate directive signal reception.

Another object of my invention is to provide a circuit arrangement for a direction finder wherein the maximum signal may be received with a high degree of sharpness for obtaining precision observations while permitting the transmission of communication signals simultaneously with the observing of the maximum signaling energy for directive reception.

Still another object of my invention is to provide a circuit arrangement for a directive receiving system in which a multiplicity of successive square law rectifiers are employed in cascade arrangement for distorting the incoming maximum signal energy to a condition in which directive observations may be taken upon the maximum signal with a high degree of precision.

A further object of my invention is to provide a directive receiving circuit for direction finding systems employing a plurality of successive rectifier stages each having non-linear characteristics for producing a distorted signal and enabling the maximum signal position of the loop antenna to be employed for taking precision directional observations.

Other and further objects of my invention reside in the circuit arrangement for direction finding receivers as set forth more fully in the specification hereinafter following by reference to the accompanying drawing, in which:

Figure 1 shows the characteristic curve of the usual type of direction finder; Fig. 2 illustrates relatively the distorted figure of eight characteristic which is received when employing a non-linear type of rectifier between the signal observing means and the source of incoming signaling energy; Fig. 3 shows relatively the characteristic curve obtained in the system of my invention when employing a multiplicity of square law rectifiers in cascade in accordance with the circuit arrangements of my invention; Fig. 4 shows relatively the sharp unilateral characteristic which is obtained when utilizing the circuits of my invention in association with both a loop antenna and an open antenna; Fig. 5 shows one arrangement of receiving circuit embodying the principles of my invention; Fig. 6 illustrates a modified arrangement of non-linear rectifier tube circuits for use in the direction finder system of my invention; and Fig. 7 shows a still further modified arrangement of circuit for directive reception employing the maximum signal point in accordance with my invention.

A radio direction finder or radio compass ordinarily uses as an antenna, a closed loop or coil antenna which has the well known figure of eight directional characteristic and the minimum signal or null points are used to determine the line of direction of a received signal. This method has several undesirable features when used with the receiving apparatus now ordinarily employed. The more objectionable features are as follows:

1. The fact that the bearing must be taken at the null signal point makes it impossible to perceive any characteristic code sign or identifying signal which may at that instant be sent by the transmitter.

2. Due to the same fact that the bearing must be taken at the null point, the receiver must be capable of great amplification, in fact, much more than is necessary if, for instance the maximum signal point could be used for the bearing. The maximum signal point, however could not be used heretofore because it is much too broad and an accurate bearing can not be taken.

3. As a result of the above two drawbacks, namely the weak signal at the null point, and the great amplification used in the receiver, a third defect appears—interference such as static, and local disturbances. These are, of course, amplified in the receiver to its fullest extent and will mask the weak desired signal.

My invention overcomes these drawbacks, and makes use of the maximum signal point to obtain the bearing. The normal directional characteristic of a loop antenna is shown in Fig. 1 having the familiar figure of eight shape. The line of minimum signal is along line $x$—$x$ and the line of maximum signal is along line $y$—$y$. Line $x$—$x$ is the one ordinarily used to obtain the bearing, the rate of change of signal with rotation of the loop being much steeper in this neighborhood than along the line $y$—$y$.

Fig. 1 represents the relative voltage values developed across the terminals of the loop antenna when the loop is rotated in the field of a radio signal. If a receiver or amplifier were to employ as the detector, a rectifier having a non-linear or square law characteristic, then the curve for the voltage in the output would give the directional characteristic of the loop a form distorted somewhat as that shown in Fig. 2, wherein the rate of change of signal becomes more rapid near the maximum signal line y—y than in Fig. 1. If, however, the rectifier or detector be of a linear or substantially linear type, the signal will vary at the rate shown in Fig. 1.

My invention makes use of this phenomenon and by using a multiplicity of such square law rectifiers in the receiving apparatus, connected in cascade, further accentuates the distortion of the figure of eight by the multiplying power of the several rectifiers, each contributing its own distortional effect. By using two or more such square law rectifiers in cascade, the figure of eight may be distorted as in Fig. 3, to a point where it is possible to use the maximum signal point as the bearing point, and further by employing the well known unidirectional circuits in conjunction with the circuit of my invention, a sharp unidirectional characteristic will be obtained similar to that shown in Fig. 4.

Fig. 5 shows one form of receiving circuit employing my invention, wherein 1 is the loop antenna circuit connected to the grid or input of the radio frequency amplifier 2, the output of which is coupled into the input circuit of rectifier 3 through grid leak and grid condenser 30. The rectifier must be of the non-linear or square law type. The radio frequency pulses in the output of rectifier 3 is then coupled into the input of a second non-linear or square law rectifier 4, the input circuit extending through grid leak and grid condenser 31, the rectifier tube 4 having in its output the usual by-pass condenser 5 and telephone receivers 6. In the ordinary receiver, the telephone receivers would be connected in the plate circuit of the first rectifier 3. If the loop is turned to a position in the vicinity of its maximum signal position a radio frequency potential of for example, 5 volts is impressed on the grid of rectifier tube 3. Then if the loop is turned so that the signal is increased to twice this value, the input voltage is increased by a ratio of 5 to 10. Now, in the plate circuit of rectifier tube 3, due to the square law action of the rectifier the signal voltage has increased by a ratio of 5 to 25. This is what causes the distortion shown in Fig. 2. If this squared voltage ratio is again utilized and applied to the grid of the rectifier tube 4 and the ratio of change in the plate circuit is again increased and the 5 to 25 ratio in the grid circuit of tube 3 has been increased to a $5^2$ to $25^2$ or 25 to 625 ratio in the plate circuit of the second rectifier tube 4. In other words, instead of the signal change at the ratio of 1 to 2 as is impressed on the grid of the first rectifier 3, the rate of change becomes 5 to 25 or 1 to 5 in the plate of the first rectifier tube 3, and $5^2$ to $25^2 = 25$ to $625 = 1$ to 25 in the plate of the second rectifier tube. By adding another rectifier the rate of change would be further increased to $25^2$ to $625^2 = 625$ to 390,625 or a ratio of 1 to 625, having started out with a ratio of 1 to 2 at the input to the first rectifier tube. It follows that due to the multiplying effect of rectifiers in cascade, that the rate of change of signal around the maximum point of the loop will be amplified to such an extent that the maximum point will become very sharp, or sharp enough to use as a bearing point in direction finding.

In Fig. 6, I have shown a modified arrangement of the circuit of my invention in which the first rectifier tube 3 has its output circuit coupled through radio frequency transformer 7 to the tuned circuit 8 connected to the input of radio frequency amplifier tube 9. The output circuit of radio frequency amplifier tube 9 is coupled through high frequency transformer 10. The secondary winding of high frequency transformer 10 is tuned by condenser 11 which connects with the input circuit of the second rectifier tube 4. The signal observing device 6 is connected in the output circuit of the second rectifier tube 4. By-pass condenser 5 is connected in the output circuit of the non-linear or square law rectifier tube 4. The signal observing device 6 may be either an electromagnetic sound reproducer or an indicating meter, suitably coupled or connected into the output circuit of rectifier tube 4.

In Fig. 7, I have shown the output circuit of the first square law rectifier tube 3 connected through the audio frequency transformer 20 to the input circuit of the electron tube oscillator 21. The radio frequency component of the incoming signaling energy is by-passed around the primary winding of the transformer 20 through condenser 22. The secondary winding of transformer 20, which is indicated at 23, is disposed in series with tuned circuit 24 of the oscillator tube 21. The secondary winding is by-passed by a capacity to provide a radio frequency return path for circuit 24. The oscillator tube 21 has its output circuit arranged to include a coupling coil 25 which is electromagnetically coupled with the inductance in the tuned circuit 24. The audio frequency signal energy in the output circuit of the non-linear rectifier 3 modulates the energy in oscillator circuit 21. The output from the oscillator which has thus been modulated, is transferred to the tuned input circuit 26 of the radio frequency amplifier 27. The output of radio frequency amplifier 27 is coupled through radio frequency transformer 28 to the input of the square law rectifier 4 which connects to the signal observing device 6 in the manner described in connection with the previous figures.

The system of my invention is highly efficient for the directive reception of signals where characteristic code signals are also to be received simultaneously with the receipt of the directive signals.

While I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a directional receiving system, a coil antenna rotatable about a vertical axis for intercepting signal energy transmitted from different directions, a signal receiving circuit connected with said coil antenna, a signal observing circuit and a plurality of non-linear characteristic rectifier circuits, each tuned to the frequency of the signal energy, interposed between said signal receiving circuit and said signal observing circuit for distorting the received signaling energy and sharpening the maximum signal energy for enabling observations of directions to be taken upon the maximum received signal energy.

2. In a directional receiving system, a coil antenna movable about a vertical axis, a signal receiving circuit connected with said coil antenna, a signal observing circuit and a plurality of alternately disposed radio frequency amplifiers and non-linear characteristic rectifiers connected in cascade by circuits tuned to the frequency of the signal to be observed and disposed between said signal receiving circuit and said signal observing circuit for effectively distorting the received signaling energy and sharpening the maximum received signaling energy when the plane of the coil antenna coincides with the direction of propagation of received signaling energy for observing the direction of the transmitting station upon receipt of the maximum received signaling energy.

3. In a radio compass, a coil antenna rotatable about a vertical axis for intercepting signal energy transmitted from different directions, a signal receiving and rectifying circuit connected with said coil antenna, a signal observing device, an oscillator connected with said signal receiving circuit and with said signal observing device, said connection between said receiving and rectifying circuit and said oscillator including means for rendering said oscillator effective upon said signal observing device over a sharpened signal energy characteristic of said coil antenna.

4. In a radio compass, a coil antenna rotatable about a vertical axis for intercepting signal energy transmitted from different directions, a signal receiving circuit connected with said coil antenna, a signal observing device, and a plurality of non-linear characteristic rectifier circuits and an oscillator connecting said signal receiving circuit and said signal observing device, said rectifiers operating to sharpen the effect of the maximum signal energy intercepted by said coil antenna upon said signal observing device.

5. In a radio compass a rotatable directional aerial which absorbs energy the amplitude of which changes as the aerial is rotated with respect to the signaling source to which said aerial is tuned, an indicating device and means interposed between said aerial and said indicating device for amplifying the energy absorbed by said aerial and for producing in said indicator a response which is non-linear with respect to the absorbed energy including a plurality of thermionic tubes connected in cascade by circuits tuned to the frequency of the source to be received, means for coupling the input of the first of said tubes to said aerial system, means for coupling the output of the last of said tubes of said cascade to said indicator and means for biasing the control grid of one or more of said tubes to a value such that the amplitude of the energy in the output of said tube varies substantially as the square of the amplitude of the energy on the input of said tube or tubes.

6. In a radio compass, a directive aerial the directivity of which may be altered for intercepting signal energy transmitted from different directions, a signal relaying circuit connected with said directive aerial, a signal indicating device, a rectifier circuit of the square law characteristic type, tuned to the frequency of the signal energy and connected with said signal relaying device, an oscillator coupled to said rectifier circuit, and a second tuned rectifier of the square law characteristic type, arranged for coupling said oscillator to said indicating device.

7. In a radio compass, a directive aerial the directivity of which may be altered for intercepting signal energy transmitted from different directions, a signal amplifying circuit connected with said directive aerial, a signal indicating device, a non-linear characteristic rectifier circuit tuned to the frequency of the signal energy and connected with said signal amplifier, an oscillator connected with said rectifier circuit, and signal amplifying and tuned non-linear characteristic rectifying means coupling said oscillator to said indicating device.

PERCIVAL D. LOWELL.